(No Model.)
E. W. RICE, Jr.
SYSTEM OF ELECTRIC DISTRIBUTION.
No. 508,839.  Patented Nov. 14, 1893.
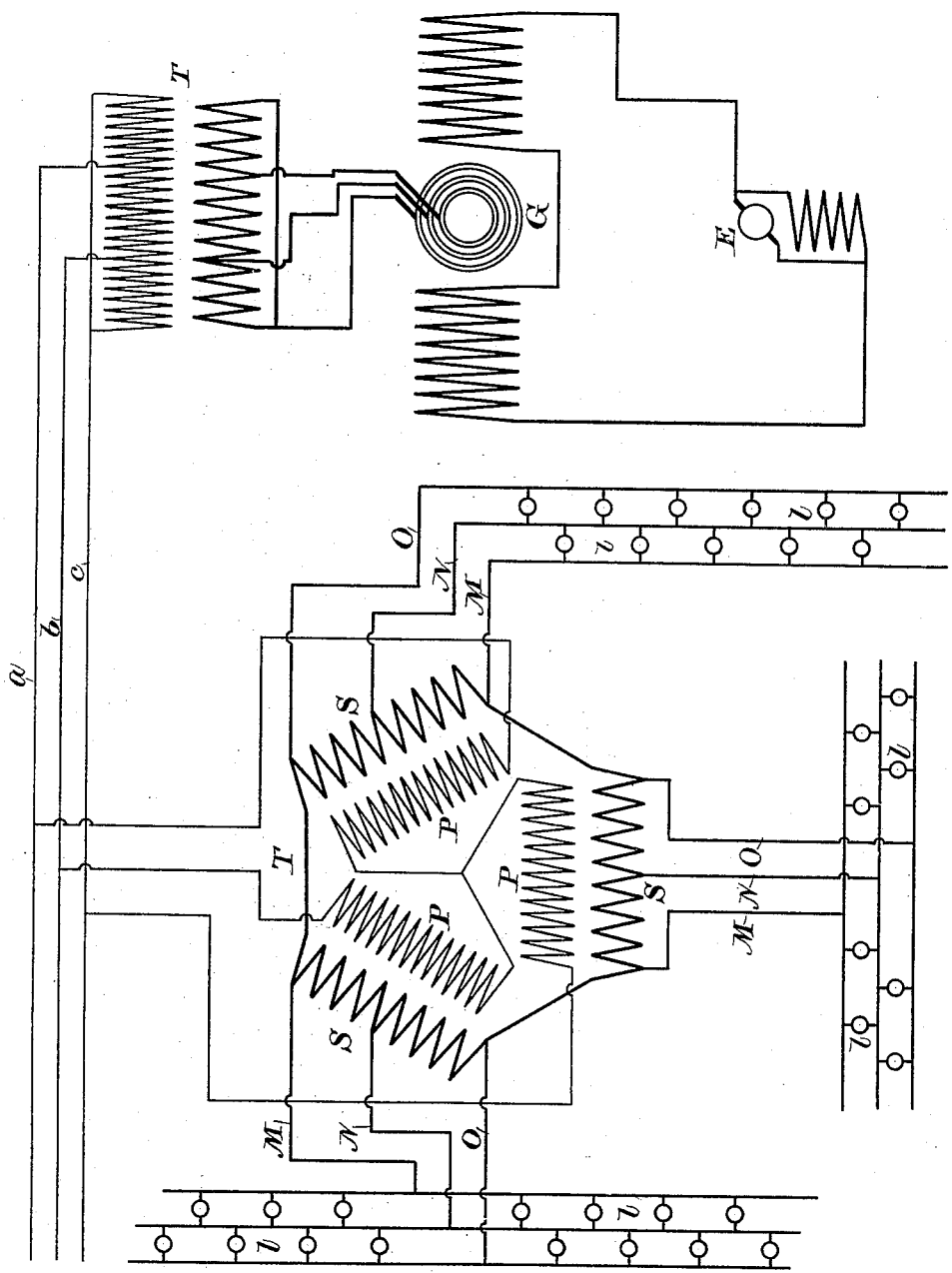
WITNESSES
INVENTOR
Edwin W. Rice, Jr.,
Bentley and Blodgett,
Attys.

ered.
UNITED STATES PATENT OFFICE.

EDWIN W. RICE, JR., OF SWAMPSCOTT, ASSIGNOR TO THE GENERAL ELECTRIC COMPANY, OF BOSTON, MASSACHUSETTS.

SYSTEM OF ELECTRIC DISTRIBUTION.

SPECIFICATION forming part of Letters Patent No. 508,839, dated November 14, 1893.

Application filed May 31, 1893. Serial No. 476,062. (No model.)

*To all whom it may concern:*

Be it known that I, EDWIN W. RICE, Jr., a citizen of the United States, residing at Swampscott, in the county of Essex and State of Massachusetts, have invented certain new and useful Improvements in Systems of Electric Distribution, of which the following is a specification.

My invention relates to systems of electric distribution and has for its object to provide such a system of great commercial efficiency and convenience. To this end I employ the so-called "three-phase" system, although any other multi-phase system of pulsating or alternating currents may be used; in such a system I use a step-up transformer, and a step-down transformer at the point of distribution, from each coil of which step-down transformer I take off mains or feeders leading to translating devices of any kind desired. It is manifest that I may equally well employ a high potential generator and a three-phase transformer adapted to feed the lines supplying the translating devices directly.

The drawing hereunto annexed and hereby made part of this specification shows in diagram a system constructed according to my invention.

In the drawing G is a generator of three-phase currents having a separate exciter E as is usual in such machines.

T is a step-up transformer adapted to convert moderate potential three-phase currents to those of a high potential and deliver to the lines $a, b, c$, which lead to the step-down transformer T', having primaries P, P, P, and secondaries S, S, S. From each of the secondaries, mains or feeders M, N, O, may be led off as shown in the drawing, where the lines represent mains including the lamps $l, l$, for which any desired translating device may be substituted.

In the drawing I have shown lamps connected by the series multiple or three-wire system and such system I prefer as more efficient and economical than any other, involving less expense for wire for the same number of lamps; but in some cases a two-wire system might be used if it be found desirable.

Having thus described my invention, what I claim as new, and wish to protect by Letters Patent of the United States, is—

1. A multi-phase transformer supplying separate translating devices from each coil of its secondaries.

2. A multi-phase transformer supplying a group of translating devices from each of its secondary coils by the three-wire or series multiple system.

3. A generator of multi-phase currents, a step-up transformer adapted to such currents, lines leading therefrom to a similar step-down transformer, and translating devices fed from a single secondary coil of such transformer.

4. A generator of multi-phase currents, a step-up transformer adapted to such currents, lines leading therefrom to a similar step-down transformer, and groups of translating devices fed from each secondary coil of such transformer.

5. A generator of multi-phase currents, a step-up transformer, lines leading therefrom to a step-down transformer, and translating devices taking current from a coil of such step-down transformer by the three-wire or series-multiple system.

6. A generator of multi-phase currents, a step-up transformer taking such currents therefrom, multi-phase connections leading to a step-down transformer, and translating devices taking current from each secondary coil of such step-down transformer by the three-wire or series-multiple system.

In witness whereof I have hereunto set my hand this 26th day of May, 1893.

EDWIN W. RICE, JR.

Witnesses:
 JOHN W. GIBBONEY,
 BENJAMIN B. HULL.